United States Patent
Kawakami et al.

(10) Patent No.: US 9,182,113 B2
(45) Date of Patent: Nov. 10, 2015

(54) STEAM GENERATOR

(75) Inventors: Ryoichi Kawakami, Tokyo (JP); Kengo Shimamura, Tokyo (JP); Tomoya Nakagawa, Tokyo (JP); Tomoyuki Inoue, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 309 days.

(21) Appl. No.: 13/437,446

(22) Filed: Apr. 2, 2012

(65) Prior Publication Data

US 2012/0247404 A1 Oct. 4, 2012

(30) Foreign Application Priority Data

Apr. 4, 2011 (JP) ................................. 2011-083115

(51) Int. Cl.
*F22D 7/00* (2006.01)
*F22B 37/10* (2006.01)
(Continued)

(52) U.S. Cl.
CPC ....................... *F22B 1/023* (2013.01)

(58) Field of Classification Search
CPC .................. F28F 9/0131–9/132; F22B 1/023; F22B 1/025; F22B 1/026; F22D 11/00; F22D 11/003
USPC .............. 122/468, 467, 460, 510, 32, 235.14, 122/511; 376/438, 462
See application file for complete search history.

(56) References Cited

U.S. PATENT DOCUMENTS

| 3,556,059 A | * | 1/1971 | Gorzegno et al. | .......... 122/406.4 |
| 3,662,718 A | * | 5/1972 | Creek et al. | ...................... 122/32 |

(Continued)

FOREIGN PATENT DOCUMENTS

| EP | 0 035 450 A1 | 9/1981 |
| EP | 0035450 A1 | 9/1981 |

(Continued)

OTHER PUBLICATIONS

Extended European Search Report dated Jul. 3, 2012, issued in corresponding European Patent Application No. 12163021.4 (7 pages).

(Continued)

*Primary Examiner* — Steven B McAllister
*Assistant Examiner* — Steven Anderson, II
(74) *Attorney, Agent, or Firm* — Westerman, Hattori, Daniels & Adrian, LLP

(57) ABSTRACT

The steam generator includes: a water supply channel for supplying a secondary coolant to a tube bundle outer casing with the secondary coolant being isolated from the recirculating secondary coolant; a recirculating secondary coolant injection section for injecting the recirculating secondary coolant toward a high temperature-side heat transfer tube bundle; and a supplied secondary coolant injection section for injecting the secondary coolant supplied from the water supply channel toward a low temperature-side heat transfer tube bundle. The recirculating secondary coolant injection section and the supplied secondary coolant injection section being disposed in the tube bundle outer casing on the side toward the tube plate. The recirculating secondary coolant injection section and the supplied secondary coolant injection section are defined such that, of the secondary coolant and the recirculating secondary coolant, the coolant having a higher relative flow rate than the other flows at a lower velocity.

4 Claims, 10 Drawing Sheets

(51) Int. Cl.
*F22B 1/16* (2006.01)
*F22B 1/02* (2006.01)

(56) References Cited

U.S. PATENT DOCUMENTS

| | | | |
|---|---|---|---|
| 3,915,123 A | 10/1975 | Reisacher | |
| 3,916,841 A * | 11/1975 | Schroder et al. | 122/32 |
| 4,208,987 A | 6/1980 | Chaix et al. | |
| 4,357,908 A | 11/1982 | Yazidjian | |
| 4,554,889 A * | 11/1985 | Lilly | 122/32 |
| 5,323,736 A * | 6/1994 | Pascal | 122/32 |
| 5,335,629 A * | 8/1994 | Cornic | 122/32 |
| 5,335,631 A * | 8/1994 | Daffos et al. | 122/383 |
| 5,347,959 A * | 9/1994 | Slama et al. | 122/32 |
| 5,492,169 A * | 2/1996 | Valadon | 165/96 |
| 5,701,850 A * | 12/1997 | Kohler et al. | 122/235.23 |
| 6,173,680 B1 | 1/2001 | Dague et al. | |
| 6,357,114 B1 * | 3/2002 | Tang et al. | 29/890.044 |
| 6,957,630 B1 * | 10/2005 | Mastronarde | 122/406.4 |
| 2008/0163792 A1 * | 7/2008 | Seitz | 106/286.3 |

FOREIGN PATENT DOCUMENTS

| | | |
|---|---|---|
| EP | 0 568 434 A1 | 11/1993 |
| EP | 0568434 A1 | 11/1993 |
| EP | 0955498 A1 | 11/1999 |
| JP | 02-017762 B2 | 4/1990 |
| KR | 1982-0000298 B1 | 3/1982 |
| KR | 1994-0005985 B1 | 6/1994 |
| KR | 10-0915747 B1 | 9/2009 |
| KR | 10-2011-0019757 A | 2/2011 |

OTHER PUBLICATIONS

Korean Notice of Allowance dated Mar. 31, 2014, issued in corresponding Korean Patent Application No. 10-2012-0033818 with English translation (6 pages).

* cited by examiner

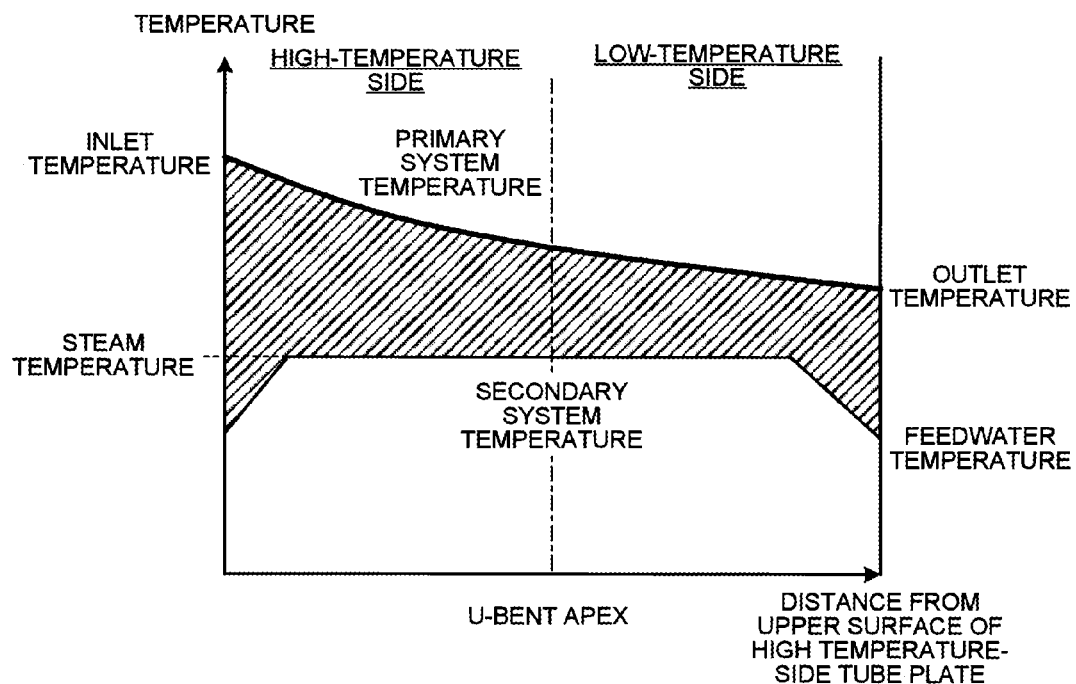
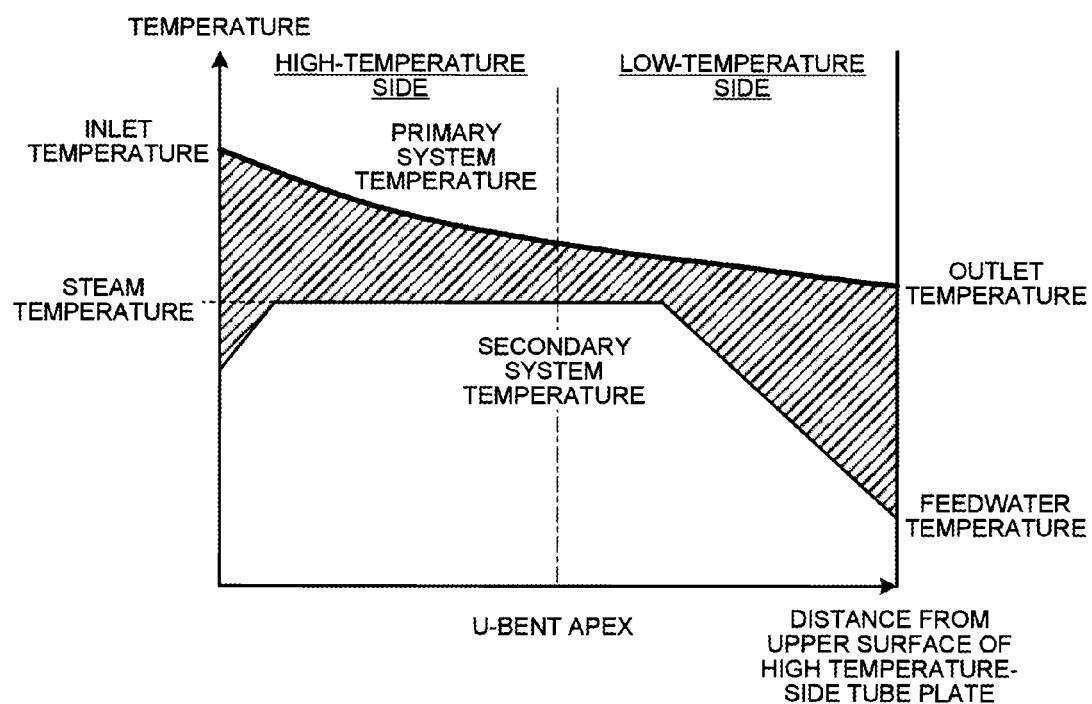

STEAM GENERATOR

FIELD

The present invention relates to a steam generator.

BACKGROUND

In a steam generator referred to as a steam generator with an economizer, separate supply channels are used for recirculating water and feedwater, and a partition plate (separating unit) supported together with heat transfer tubes by a tube support plate is provided. Mixing of the recirculating water with the feedwater is thereby suppressed, and thermal efficiency is improved (for example, Patent Literature 1).

CITATION LIST

Patent Literature

Patent Literature 1: Japanese Examined Patent Application Publication No. Hei. 2-17762

SUMMARY

Technical Problem

However, the partition plate is installed on the tube support plate and a tube plate in a complex manner. In addition, since the partition plate is present, a plurality of inspection holes for inspection of the tube plate must be provided in the barrel of the steam generator.

The present invention solves the foregoing problems, and it is an object of the invention to provide a steam generator in which mixing of a recirculating secondary coolant with a secondary coolant supplied from a water supply channel can be suppressed without using a partition plate.

Solution to Problem

According to an aspect of the present invention, a steam generator includes: a barrel section having a sealed hollow shape; a tube bundle outer casing being disposed with a predetermined gap provided between the tube bundle outer casing and an inner wall of the barrel section; a high temperature-side heat transfer tube bundle and a low temperature-side heat transfer tube bundle including a plurality of heat transfer tubes disposed in the tube bundle outer casing and having an inverse U-shape; a tube plate being secured to the barrel section on a side near a water chamber so as to secure ends of the plurality of heat transfer tubes; a plurality of tube support plates for supporting the heat transfer tubes; a steam-water separator being disposed in an upper portion of the barrel section so as to separate steam and a recirculating secondary coolant; a water supply channel for supplying a secondary coolant to the tube bundle outer casing with the secondary coolant being isolated from the recirculating secondary coolant; a recirculating secondary coolant injection section for injecting the recirculating secondary coolant toward the high temperature-side heat transfer tube bundle; and a supplied secondary coolant injection section for injecting the secondary coolant supplied from the water supply channel toward the low temperature-side heat transfer tube bundle, the recirculating secondary coolant injection section and the supplied secondary coolant injection section being disposed in the tube bundle outer casing on a side near the tube plate. The recirculating secondary coolant injection section and the supplied secondary coolant injection section are configured such that, of the secondary coolant and the recirculating secondary coolant, the coolant having a higher relative flow rate than the other flows at a lower velocity.

With the above configuration, mixing of the recirculating secondary coolant with the secondary coolant supplied from the water supply channel can be suppressed without using a partition plate. The temperature of steam in the high temperature-side heat transfer tube bundle thereby increases, and the temperature of steam in the low temperature-side heat transfer tube bundle decreases. Therefore, in the steam generator, heat transfer efficiency can be improved. In addition, in the steam generator, the man hours for assembling the partition plate and the burden of its cost can be reduced.

In a preferred aspect of the present invention, it is preferable that the opening area of the recirculating secondary coolant injection section be different from the opening area of the supplied secondary coolant injection section. With this configuration, the mixing of the recirculating secondary coolant with the secondary coolant supplied from the water supply channel can be suppressed.

In a preferred aspect of the present invention, it is preferable that a flow straightening member shorter than the distances between the tube plate and the tube support plates be formed on the surface of the tube plate and disposed between the high temperature-side heat transfer tube bundle and the low temperature-side heat transfer tube bundle. With this configuration, the mixing of the recirculating secondary coolant with the secondary coolant supplied from the water supply channel can be suppressed. In contrast to the partition plate, the flow straightening member is not required to pass through the tube support plates. Therefore, the cost of the tube support plates can be reduced when compared with the case where the partition plate is used.

In a preferred aspect of the present invention, it is preferable that the tube support plate has: first through holes for the high temperature-side heat transfer tube bundle, the heat transfer tubes passing through the first through holes; and second through holes for the high temperature-side heat transfer tube bundle, the heat transfer tubes passing through the second through holes. It is also preferable that the opening area of the first through hole be smaller than the opening area of the second through hole. With this configuration, the mixing of the recirculating secondary coolant with the secondary coolant supplied from the water supply channel can be suppressed.

In a preferred aspect of the present invention, it is preferable that the heat transfer tubes be arranged in a triangular pattern and that the ratio of the pitch of the heat transfer tubes to the outer diameter thereof be smaller than 1.46. With this configuration, the heat transfer tubes are densely arranged, and the mixing of the recirculating secondary coolant with the secondary coolant supplied from the water supply channel can be suppressed.

Advantageous Effects of Invention

According to the present invention, a steam generator can be provided in which the mixing of the recirculating secondary coolant with the secondary coolant supplied from the water supply channel can be suppressed without using a partition plate.

BRIEF DESCRIPTION OF DRAWINGS

FIG. 6A is a diagram illustrating thermal efficiency in a comparative example.

FIG. 6B is a diagram illustrating thermal efficiency in an evaluation example.

DESCRIPTION OF EMBODIMENTS

Modes for carrying out the present invention (embodiments) will be described in detail with reference to the drawings. However, the present invention is not limited to the description of the following embodiments. The components described below include those readily apparent to persons skilled in the art and those substantially similar thereto. In addition, the components described below can be appropriately combined with each other.

First Embodiment

Figure 1:
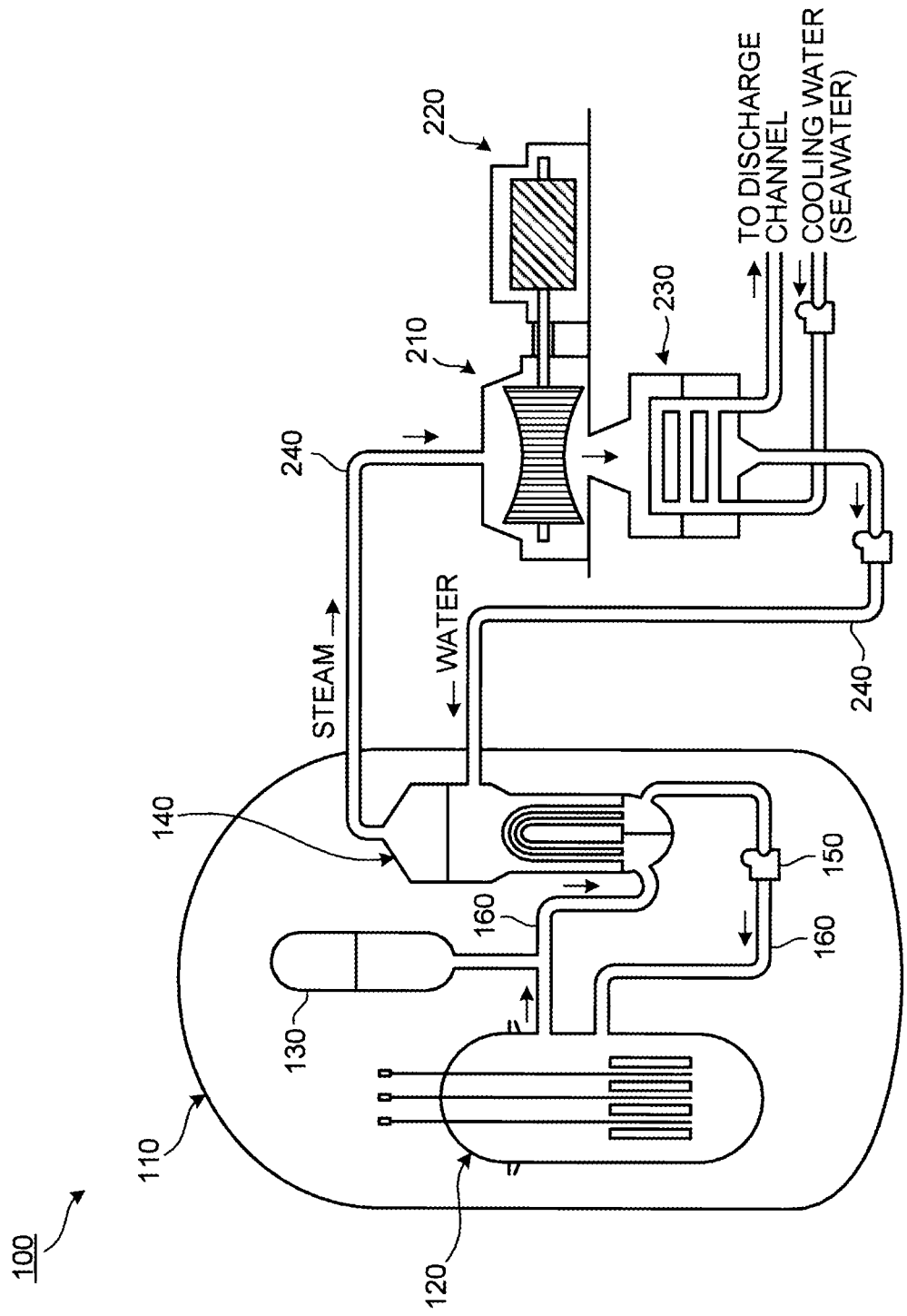
FIG. 1 is a diagram illustrating the configuration of a nuclear power plant.
Figure 2:
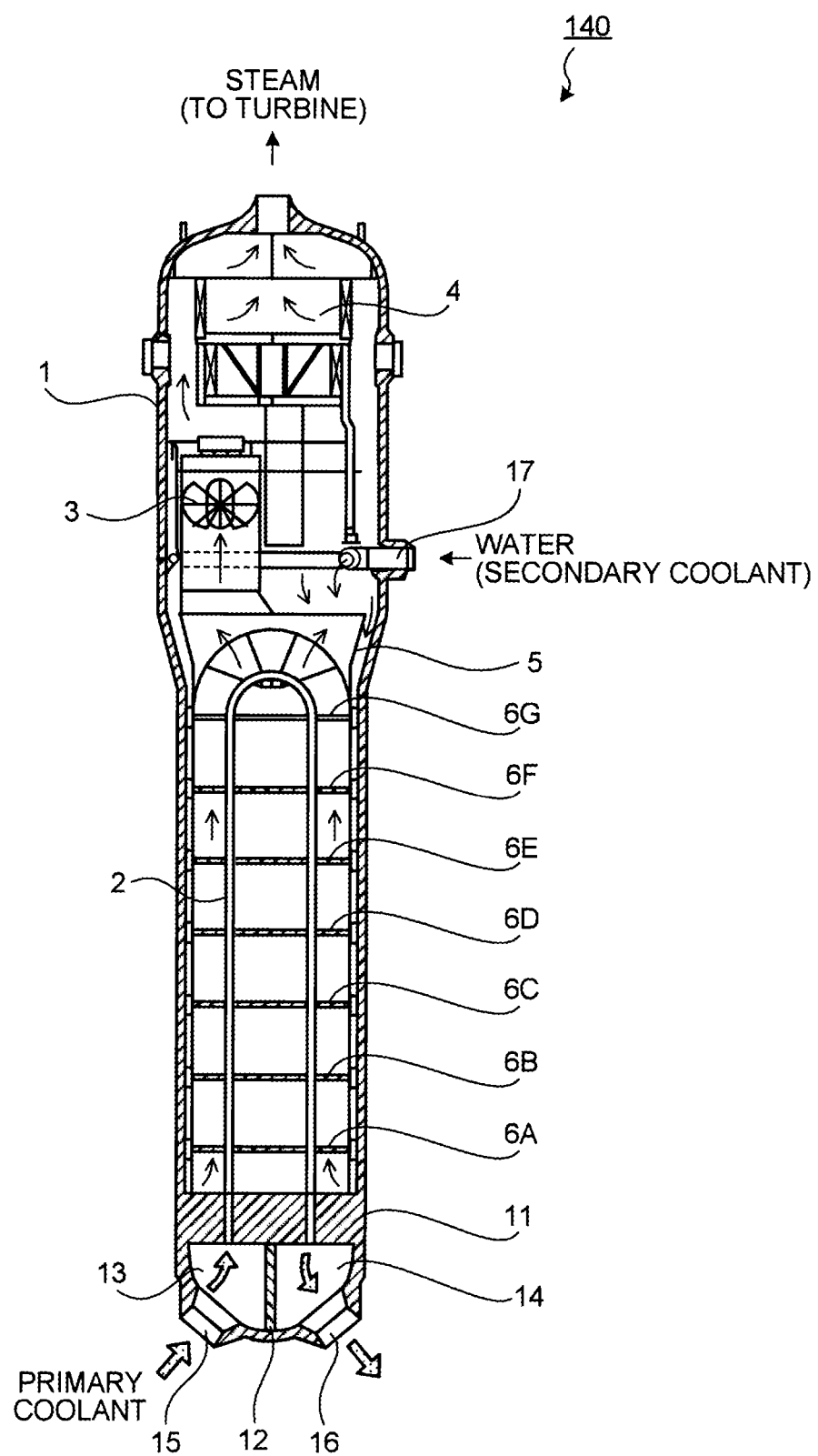
FIG. 2 is a diagram illustrating the configuration of a steam generator in the nuclear power plant described in FIG. 1.

FIG. 1 is a diagram illustrating the configuration of a nuclear power plant. FIG. 2 is a diagram illustrating the configuration of a steam generator in the nuclear power plant described in FIG. 1.

Examples of the nuclear power plant 100 include a pressurized water type light water reactor nuclear power plant facility (see FIG. 1). In the nuclear power plant 100, a reactor containment vessel 110, a nuclear reactor 120, a pressurizer 130, a steam generator 140, and a pump 150 are sequentially connected through primary coolant tubing 160 to form a circulation path for the primary coolant (a primary circulation path). A circulation path for a secondary coolant (a secondary circulation path) is formed between the steam generator 140 and a turbine 210.

The nuclear reactor 120 included in the nuclear power plant 100 is a pressurized water type light water reactor. Therefore, the primary coolant in the primary circulation path is pressurized by the pressurizer 130, and the pressure of the primary coolant is maintained at a predetermined level. In the nuclear power plant 100, the primary coolant is first heated by the nuclear reactor 120 and then supplied to the steam generator 140. Then the primary coolant is subjected to heat exchange with the secondary coolant in the steam generator 140, and the secondary coolant is thereby vaporized and converted to steam. The vaporized secondary coolant is supplied to the turbine 210, and the turbine 210 is thereby driven, so that power is supplied to a power generator 220. The primary coolant that has passed through the steam generator 140 is recovered through the primary coolant tubing 160 and supplied toward the nuclear reactor 120. The secondary coolant that has passed through the turbine 210 is cooled in a condenser 230, recovered through secondary coolant tubing 240, and supplied to the steam generator 140.

The steam generator 140 includes a barrel section 1, a plurality of heat transfer tubes 2, a steam-water separator 3, and a moisture separator 4 (see FIG. 2). The barrel section 1 has a substantially cylindrical shape and a sealed hollow structure and is disposed with its lengthwise direction directed vertically. The barrel section 1 has in its bottom a pair of water chambers 13 and 14 sectioned by a tube plate 11 and a partition plate 12. The water chamber 13 (14) is connected to the primary coolant tubing 160 through an inlet-side nozzle 15 (an outlet-side nozzle 16).

The heat transfer tubes 2 have a substantially U-shape and are disposed in the barrel section 1 with their opposite ends directed vertically downward. The opposite ends of the heat transfer tubes 2 are inserted into the tube plate 11, expanded, and secured thereto. The opposite ends of each of the heat transfer tubes 2 are in communication with the inlet water chamber 13 and the outlet water chamber 14, respectively. A tube bundle outer casing 5 having a cylindrical shape is disposed inside the barrel section 1, and the plurality of heat transfer tubes 2 are disposed inside the tube bundle outer casing 5.

A plurality of tube support plates 6A, 6B, 6C, 6D, 6E, 6F, and 6G are disposed in the tube bundle outer casing 5 at predetermined intervals. These tube support plates 6A, 6B, 6C, 6D, 6E, 6F, and 6G are plates having a large number of holes, and the heat transfer tubes 2 pass through the tube support plates 6A, 6B, 6C, 6D, 6E, 6F, and 6G. A predetermined clearance is provided between each of the heat transfer tubes 2 and each of the through holes formed in the tube support plates 6A, 6B, 6C, 6D, 6E, 6F, and 6G.

The tube bundle outer casing 5 is disposed with a gap provided between the casing 5 and the inner wall of the barrel section 1. The steam-water separator 3 is a device for separating feedwater into steam and hot water. The hot water is used as a recirculating secondary coolant that flows back in a direction toward the tube plate 11 and recirculates. The moisture separator 4 is a device for reducing the amount of moisture in the separated steam to convert it to substantially dry steam.

In the steam generator 140, the primary coolant flows from the inlet-side nozzle 15 into the inlet water chamber 13, passes through the heat transfer tubes 2, flows into the outlet water chamber 14, and is then discharged to the outside through the outlet-side nozzle 16. The secondary coolant is introduced into the barrel section 1 from a water supply tube 17 and flows inside the tube bundle outer casing 5. Then heat exchange between the primary coolant and the secondary coolant occurs, and the secondary coolant is thereby heated. In other words, the steam generator 140 is a heat exchanger. As the resultant secondary coolant passes through the steam-water separator 3 and the moisture separator 4, the steam component in the secondary coolant is extracted and supplied toward the turbine 210.

Figure 3:
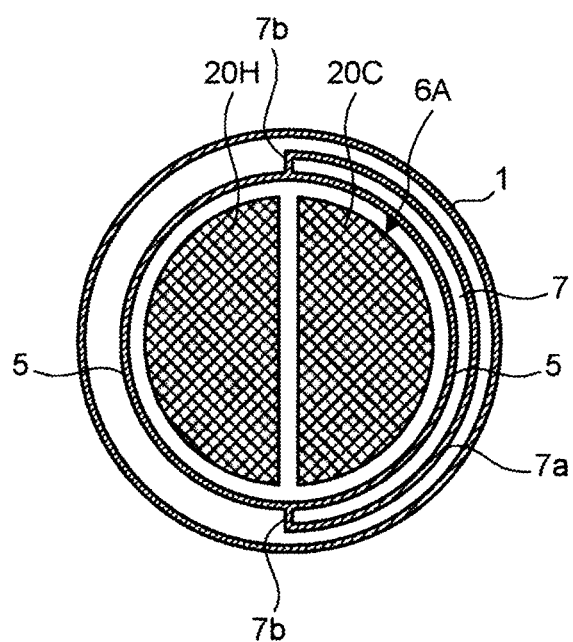
FIG. 3 is a diagram illustrating a supplied secondary coolant flow channel.
Figure 4:
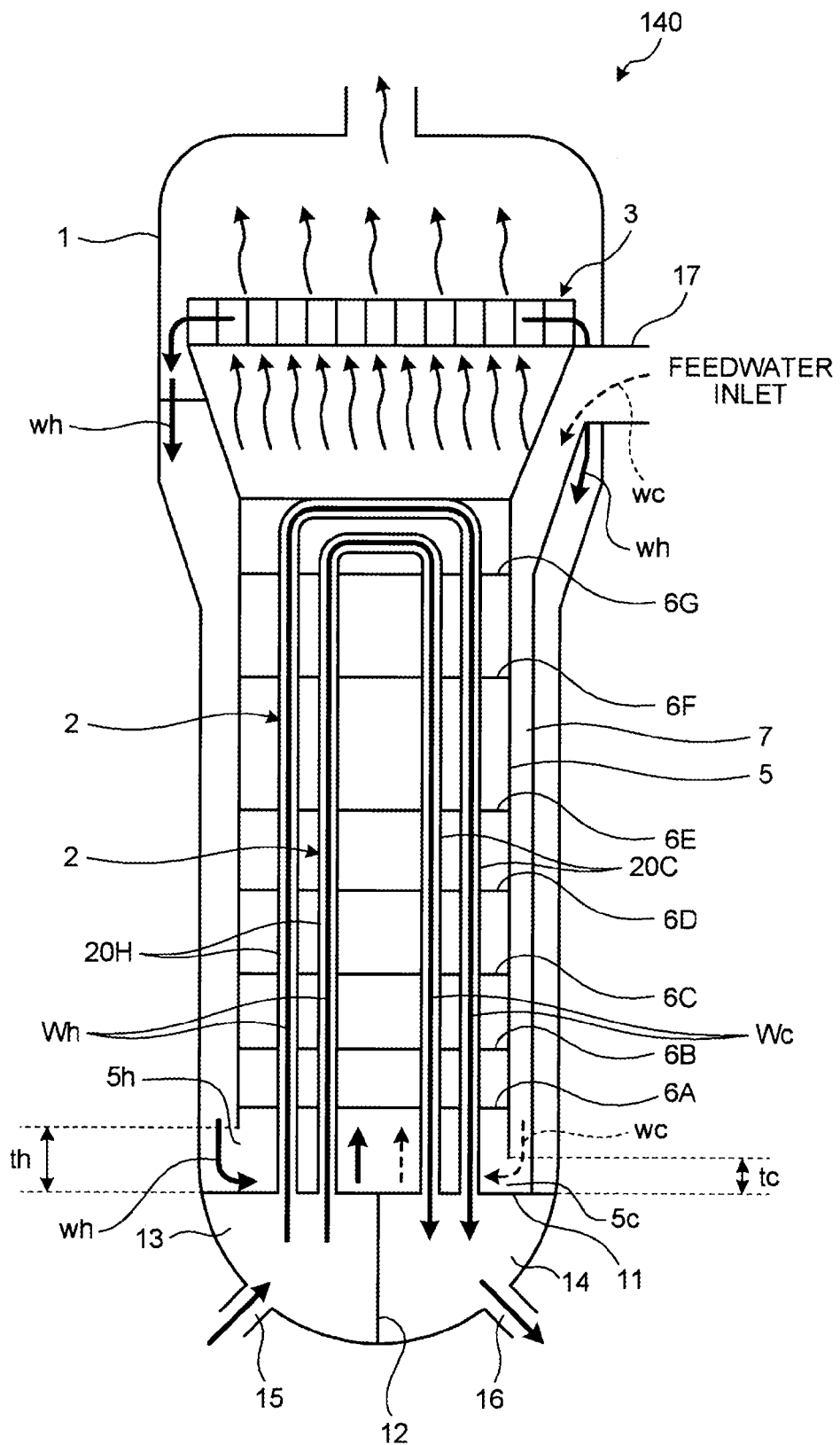
FIG. 4 is a schematic diagram illustrating an example of the steam generator of a first embodiment.

FIG. 3 is a diagram illustrating a supplied secondary coolant flow channel. FIG. 4 is a schematic diagram illustrating an example of the steam generator of the first embodiment. As shown in FIG. 3 which is a cross-section viewed from vertically below, the steam generator 140 includes a supplied secondary coolant flow channel 7 formed between the inner wall of the barrel section 1 and the tube bundle outer casing 5 to allow the flow of the secondary coolant supplied from the water supply tube 17.

As described above, the primary coolant Wh flows into the inlet water chamber 13 from the inlet-side nozzle 15, passes through the heat transfer tubes 2, flows into the outlet water chamber 14, and is then discharged to the outside through the outlet-side nozzle 16. In the substantially U-shaped heat transfer tubes 2, the temperature of the primary coolant decreases as the primary coolant Wh near the inlet water chamber 13 becomes the primary coolant Wc near the outlet water chamber 14 as a result of heat exchange. A heat transfer tube bundle on the inlet water chamber 13 side is referred to as a high temperature-side heat transfer tube bundle 20H, and a heat transfer tube bundle on the outlet water chamber 14 side is referred to as a low temperature-side heat transfer tube bundle 20C. The supplied secondary coolant flow channel 7 includes a supplied secondary coolant separation wall 7a and flow channel ends 7b. Therefore, the supplied secondary coolant flow channel 7 isolates the supplied secondary coolant wc from the recirculating secondary coolant wh so that they do not mix with each other. The supplied secondary coolant flow channel 7 is formed along the tube bundle outer casing 5 in a semicylindrical region outside the low temperature-side heat transfer tube bundle 20C and extends downward from the position of the water supply tube 17 to the tube plate 11. In the steam generator 140 of the present embodiment, the water supply tube 17 supplies the supplied secondary coolant wc to the supplied secondary coolant flow channel 7.

As shown in FIG. 4, the steam-water separator 3 discharges the separated recirculating secondary coolant wh toward the tube plate 11 from the steam-water separator 3 through the outer circumference of the tube bundle outer casing 5. The tube bundle outer casing 5 has a recirculating secondary coolant injection section 5h having an opening facing the tube plate 11. The opening of the recirculating secondary coolant injection section 5h is formed in a semicircular region of the tube bundle outer casing 5 and located at a constant opening height th. The recirculating secondary coolant wh flows into the tube bundle outer casing 5 from the recirculating secondary coolant injection section 5h of the tube bundle outer casing 5. More specifically, the recirculating secondary coolant injection section 5h injects the recirculating secondary coolant wh toward the high temperature-side heat transfer tube bundle 20H.

The water supply tube 17 supplies the supplied secondary coolant wc. The supplied secondary coolant wc passes downward through the supplied secondary coolant flow channel 7 and reaches the tube plate 11. The supplied secondary coolant flow channel 7 isolates the supplied secondary coolant wc from the recirculating secondary coolant wh so that they do not mix with each other. The tube bundle outer casing 5 has a supplied secondary coolant injection section 5c formed on the inner side of the supplied secondary coolant flow channel 7 and having an opening facing the tube plate 11. The opening of the supplied secondary coolant injection section 5c is formed in a semicircular region of the tube bundle outer casing 5 and located at a constant opening height tc. The supplied secondary coolant injection section 5c injects the supplied secondary coolant wc supplied from the supplied secondary coolant flow channel 7 toward the low temperature-side heat transfer tube bundle 20C.

Since the supplied secondary coolant wc has been cooled in the condenser 230, the temperature of the supplied secondary coolant wc is generally lower than the temperature of the recirculating secondary coolant wh. Since the supply sources of the supplied secondary coolant wc and the recirculating secondary coolant wh are different, their flow rates are often different from each other. For example, the ratio of the flow rate of the supplied secondary coolant wc to the flow rate of the recirculating secondary coolant wh is about 1:2.

Figure 5:
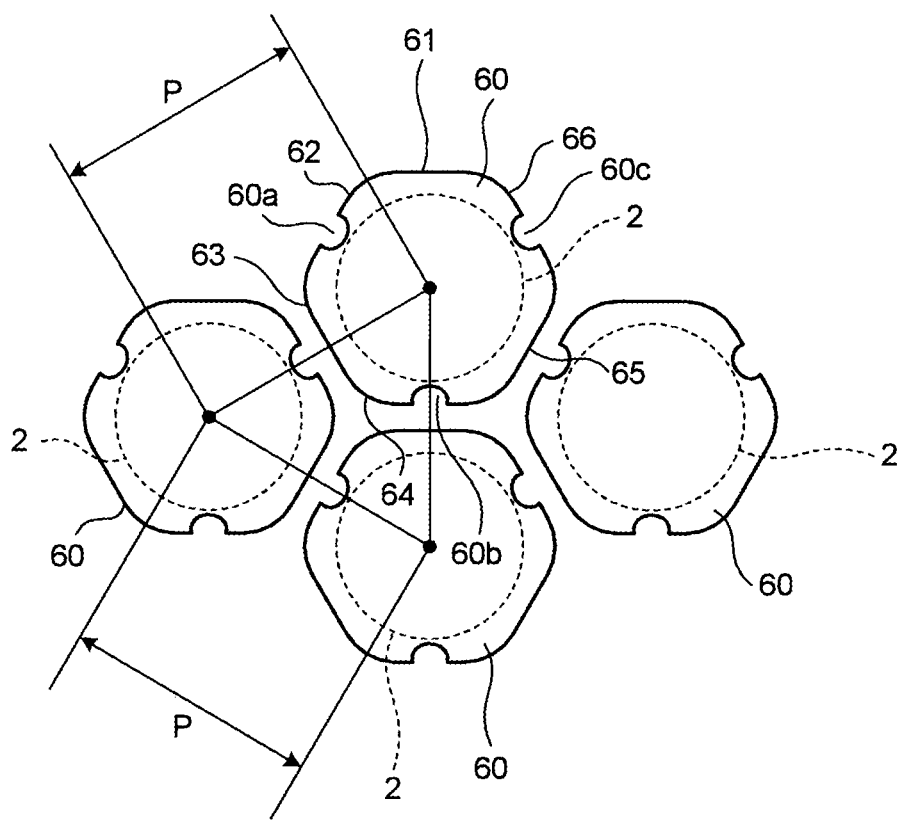
FIG. 5 is a schematic diagram illustrating an example of through holes in a tube support plate.

When the supplied secondary coolant wc and the recirculating secondary coolant wh flow into the tube bundle outer casing 5, they flow upward around the heat transfer tubes 2 toward the steam-water separator 3 while subjected to heat exchange. The heat transfer tubes 2 are supported by the plurality of tube support plates 6A, 6B, 6C, 6D, 6E, 6F, and 6G. FIG. 5 is a schematic diagram illustrating an example of the through holes in a tube support plate.

For example, a large number of through holes 60 through which the heat transfer tubes 2 pass are formed in each of the tube support plates 6A, 6B, 6C, 6D, 6E, 6F, and 6G. Each through hole 60 has a hexagonal shape. The hexagonal shape has six sides 61, 62, 63, 64, 65, and 66, and protrusions 60a, 60b, and 60c are formed on alternate sides 62, 64, and 66. The through holes 60 are arranged in a so-called honeycomb pattern. This allows the opening areas of the through holes 60 to be increased to reduce pressure loss and allows the strength of the tube support plates 6A, 6B, 6C, 6D, 6E, 6F, and 6G to be ensured.

The heat transfer tubes 2 are arranged in a so-called triangular pattern. Preferably, the pitch P of the heat transfer tubes 2, i.e., the distance between the centers of the tubes 2, is for example 25.4 mm or larger and 27 mm or smaller, and the outer diameter of the heat transfer tubes 2 is, for example, 19.05 mm. More specifically, the ratio of the pitch to the outer diameter that is the pitch P/the outer diameter is smaller than 1.46. With this configuration, the heat transfer tubes 2 are densely arranged, and the degree of mixing of the supplied secondary coolant wc with the recirculating secondary coolant wh is reduced. Preferably, the heat transfer tubes 2 are designed such that the ratio of the outer diameter to the pitch P is small, as described above.

Since a clearance (gap) is formed between each of the heat transfer tubes 2 and each of the large number of through holes 60 through which the heat transfer tubes 2 pass, the supplied secondary coolant wc and the recirculating secondary coolant wh flow from the surface of the tube plate 11, pass through the tube support plates 6A, 6B, 6C, 6D, 6E, 6F, and 6G, and flow upward toward the steam-water separator 3.

FIG. 6A is a diagram illustrating thermal efficiency in a comparative example. FIG. 6B is a diagram illustrating thermal efficiency in an evaluation example. In these figures, the high-temperature side represents the side on which the high temperature-side heat transfer tube bundle 20H is disposed in the tube bundle outer casing 5, and the low-temperature side represents the side on which the low temperature-side heat transfer tube bundle 20C is disposed in the tube bundle outer casing 5. The primary system temperature represents the temperature of the primary coolants Wh and Wc in the heat transfer tubes 2, and the secondary system temperature represents the temperature of the secondary coolants (the supplied secondary coolant wc and the recirculating secondary coolant wh) in the tube bundle outer casing 5. The U-bent apex is the U-shaped curved section of each heat transfer tube 2. The vertical axes represent temperature, and the horizontal axes represent the distance from the upper surface of the high temperature-side tube plate.

In the comparative example, the water supply tube 17 extends along the entire circumference of the barrel section 1. In addition, no supplied secondary coolant flow channel 7 is provided. This steam generator is of the general type in which the water supply tube 17 supplies the supplied secondary coolant wc along the entire circumference of the tube bundle outer casing 5, and the supplied secondary coolant wc and the recirculating secondary coolant wh flow from the opening of the tube bundle outer casing 5 that faces the tube plate 11 while being mixed. The evaluation example is the steam generator 140 of the present embodiment.

In each of FIGS. 6A and 6B, the diagonally shaded area represents the total amount of heat transferred from the nuclear reactor 120 to the steam generator 140. The amounts of heat managed in the comparative example and the evaluation example are the same. Preferably, in the steam generator 140, the pressure of the steam supplied to the turbine 210 is high. Therefore, to increase the temperature of the steam, it is preferable to change the distribution of the secondary system temperature of the secondary coolant. More specifically, in the evaluation example in FIG. 6B, the temperature of the steam on the high temperature side is allowed to increase and the temperature of the steam on the low temperature side is allowed to decrease when compared with the comparative example in FIG. 6A.

In the steam generator 140 of the present embodiment, since the supplied secondary coolant wc lower in temperature than the recirculating secondary coolant wh is supplied to the low temperature-side heat transfer tube bundle 20C, the temperature of supplied water in FIG. 6B is allowed to decrease when compared with that in FIG. 6A. Therefore, the temperature of the secondary coolant in the tube bundle outer casing 5 is lower in the low temperature-side heat transfer tube bundle 20C than in the high temperature-side heat transfer tube bundle 20H. If the supplied secondary coolant wc is mixed with the recirculating secondary coolant wh before they reach the vicinity of the U-bent apex, the temperature of the steam on the high temperature side decreases, as in the comparative example in FIG. 6A. Conventionally, a partition plate, for example, is used to reduce the possible mixing of the supplied secondary coolant wc with the recirculating secondary coolant wh before they reach the vicinity of the U-bent apex. However, the man hours for assembling the partition plate are high, and the burden of its cost is high.

In the steam generator 140 of the present embodiment, the recirculating secondary coolant injection section 5h and the supplied secondary coolant injection section 5c are defined such that, of the supplied secondary coolant wc and the recirculating secondary coolant wh, the coolant having a higher relative flow rate than the other flows at a lower velocity. For example, when the ratio of the flow rate of the supplied secondary coolant wc to the flow rate of the recirculating secondary coolant wh is 1:2 as described above, the ratio of the opening area of the recirculating secondary coolant injection section 5h to the opening area of the supplied secondary coolant injection section 5c is set to 2:1. To set the opening area of the recirculating secondary coolant injection section 5h and the opening area of the supplied secondary coolant injection section 5c differently, their opening heights, for example, are set to be different from each other. For example, the ratio of the opening height th to the opening height tc is set to 2:1. This configuration reduces the difference in flow velocity of the supplied secondary coolant wc and the recirculating secondary coolant wh when the coolants wc and wh come into collision with each other in a region between the low temperature-side heat transfer tube bundle 20C and the high temperature-side heat transfer tube bundle 20H. Therefore, the supplied secondary coolant wc or the recirculating secondary coolant wh becomes an upward flow from the tube plate 11 toward the steam-water separator 3 with mutual mixing being suppressed.

In order to set the opening area of the recirculating secondary coolant injection section 5h and the opening area of the supplied secondary coolant injection section 5c differently, for example, the recirculating secondary coolant injection section 5h and the supplied secondary coolant injection section 5c may be formed from plates with a large number of holes or plates with slits, and the areal ratios of the holes or the areas of the slits may be set differently to obtain different opening areas.

As described above, the steam generator 140 of the present embodiment includes: the barrel section 1 having a sealed hollow shape; the tube bundle outer casing 5 disposed with a predetermined gap provided between the casing 5 and the inner wall of the barrel section 1; the high temperature-side heat transfer tube bundle 20H and the low temperature-side heat transfer tube bundle 20C that include the plurality of heat transfer tubes 2 disposed in the tube bundle outer casing 5 and having an inverse U-shape; the tube plate 11 that is secured to the barrel section 1 on the side near the water chambers 13 and 14 and secures the ends of the plurality of heat transfer tubes 2; the plurality of tube support plates 6A, 6B, 6C, 6D, 6E, 6F, and 6G that support the heat transfer tubes 2; the steam-water separator 3 that is disposed in the upper portion of the barrel section 1 and separates steam and the recirculating secondary coolant wh from each other; and the supplied secondary coolant flow channel 7 for supplying the supplied secondary coolant wc to the tube bundle outer casing 5 with the supplied secondary coolant wc being isolated from the recirculating secondary coolant wh. The tube bundle outer casing 5 has: the recirculating secondary coolant injection section 5h for injecting the recirculating secondary coolant wh toward the high temperature-side heat transfer tube bundle 20H; and the supplied secondary coolant injection section 5c for injecting the supplied secondary coolant wc supplied from the supplied secondary coolant flow channel 7 toward the low temperature-side heat transfer tube bundle 20C, the recirculating secondary coolant injection section 5h and the supplied secondary coolant injection section 5c being formed on the side near the tube plate 11. The recirculating secondary coolant injection section 5h and the supplied secondary coolant injection section 5c are defined such that, of the supplied secondary coolant wc and the recirculating secondary coolant wh, the coolant having a higher relative flow rate than the other flows at a lower velocity.

With this configuration, the mixing of the recirculating secondary coolant wh with the supplied secondary coolant wc can be suppressed without using a partition plate. The temperature of steam in the high temperature-side heat transfer tube bundle 20H thereby increases, and the temperature of steam in the low temperature-side heat transfer tube bundle 20C decreases. Therefore, in the steam generator 140 of the present embodiment, heat transfer efficiency can be improved. In addition, in the steam generator 140 of the present embodiment, the man hours for assembling the partition plate and the burden of its cost can be reduced.

Second Embodiment

Figure 7:
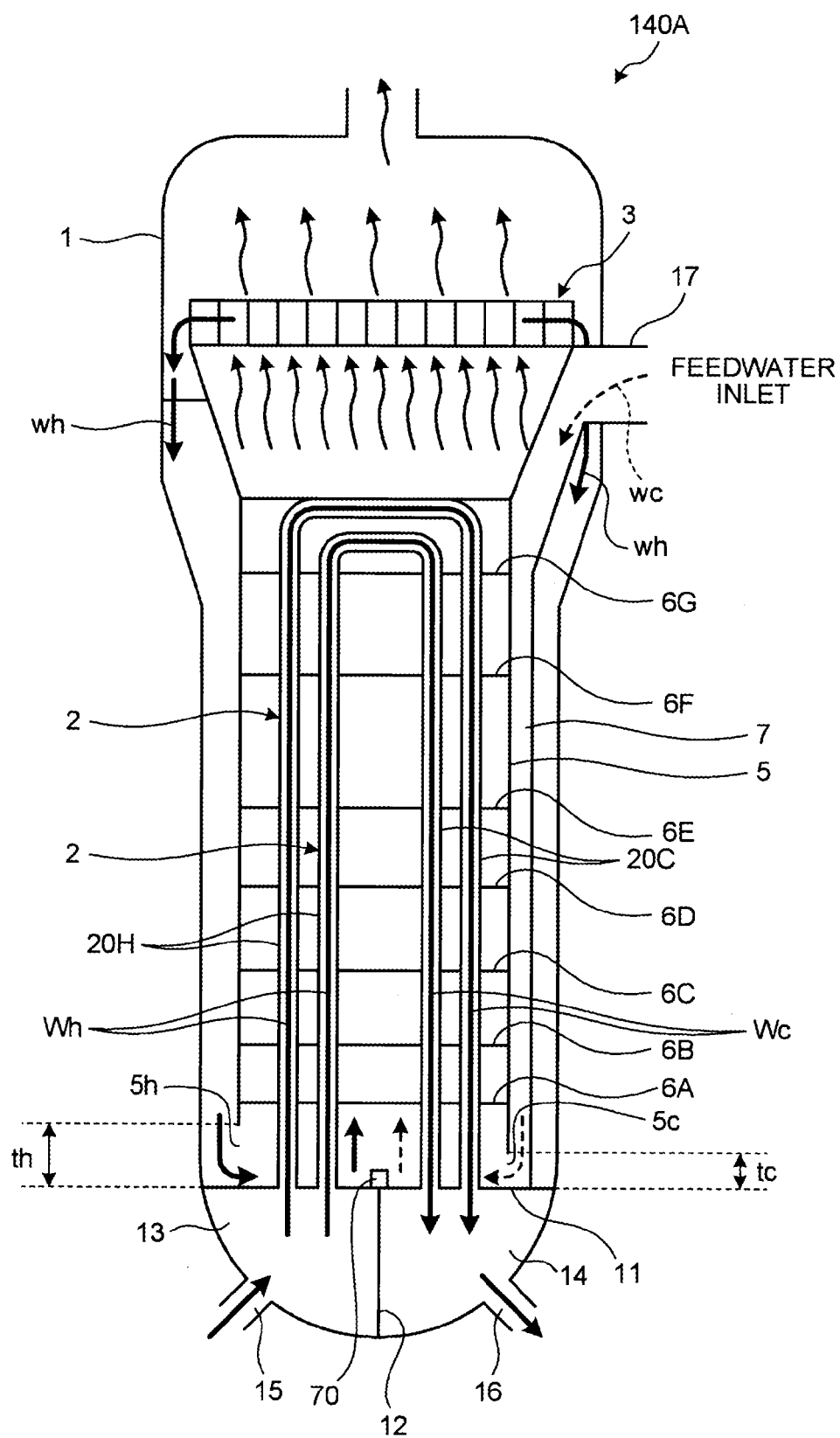
FIG. 7 is a schematic diagram illustrating an example of a steam generator of a second embodiment.
Figure 8:
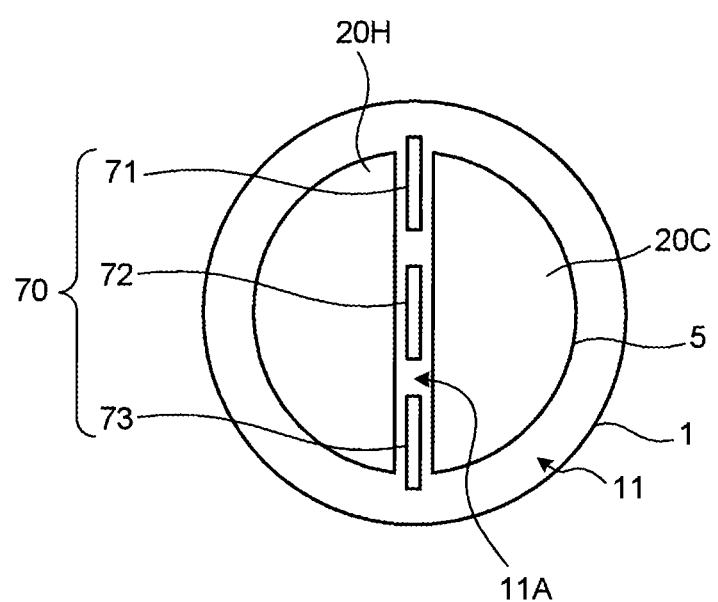
FIG. 8 is a schematic diagram illustrating an example of the upper surface of a tube plate.

FIGS. 7 and 8 are schematic diagrams illustrating an example of a steam generator of a second embodiment. FIG. 8 is a schematic diagram illustrating an example of the upper surface of a tube plate. The steam generator 140A of the present embodiment is characterized in that flow straightening members 70 are provided on the surface of the tube plate 11. In the following description, the same components as those described in the first embodiment are denoted by the same reference numerals, and a redundant description will be omitted.

As shown in FIG. 7, in the steam generator 140A of the second embodiment, the flow straightening members 70 are disposed in the tube bundle outer casing 5 and formed on the surface of the tube plate 11. As shown in FIG. 8, the tube plate 11 secures the ends of the heat transfer tubes 2 with the ends directed vertically downward, and a semicircular region containing the high temperature-side heat transfer tube bundle 20H and a semicircular region containing the low temperature-side heat transfer tube bundle 20C are partitioned from each other and face each other. A tube lane 11A to which no heat transfer tubes 2 are secured is formed in the tube plate 11 in a region between the high temperature-side heat transfer tube bundle 20H and the high temperature-side heat transfer tube bundle 20C.

Figure 9A:
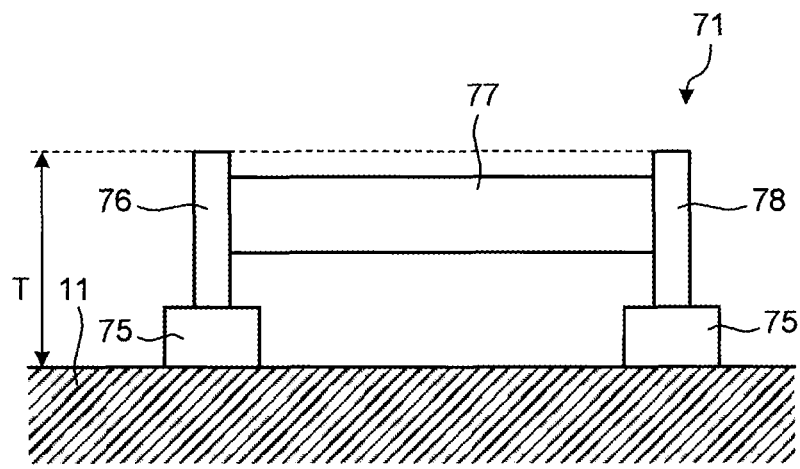
FIG. 9A is a schematic cross-sectional view illustrating an example of a flow straightening member of the second embodiment.
Figure 9B:
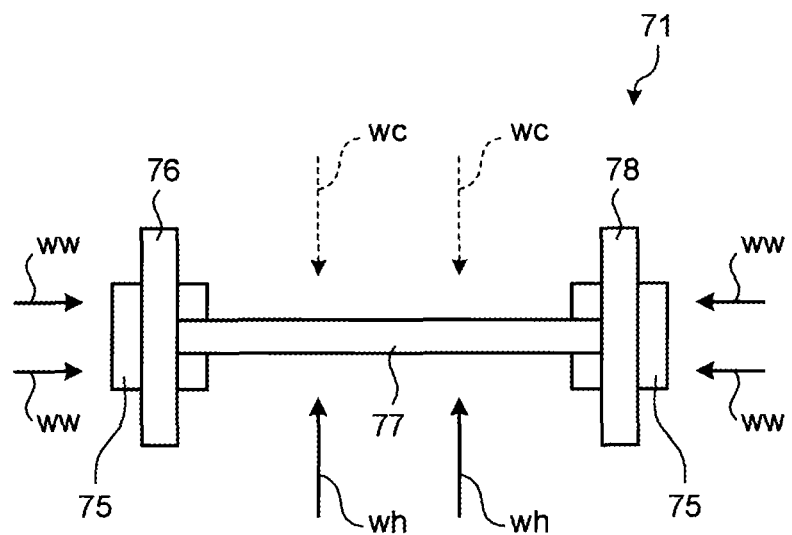
FIG. 9B is a schematic top view of FIG. 9A.

For example, the flow straightening members 70 are formed by arranging a plurality of flow straightening members 71, 72, and 73 along the tube lane 11A. FIG. 9A is a schematic cross-sectional view illustrating an example of a flow straightening member of the second embodiment. FIG. 9B is a schematic top view of FIG. 9A.

Since the flow straightening members 71, 72, and 73 have the same structure, the flow straightening member 71 will be described as an example. The flow straightening member 71 shown in FIG. 9A includes mounts 75, subsidiary flow straightening plates 76 and 78, and a main flow straightening plate 77. The mounts 75 are bases secured to the tube plate 11. The subsidiary flow straightening plates 76 and 78 are secured to the upper surfaces of the mounts 75. The main flow straightening plate 77 is a plate-shaped member held between the subsidiary flow straightening plates 76 and 78. The subsidiary flow straightening plates 76 and 78 are also plate-shaped members. The height T of the flow straightening member 71 measured from the surface of the tube plate 11 is made smaller (shorter) than the height (distance) from the surface of the tube plate 11 to the tube support plate 6A. Therefore, there is no fear that the flow straightening members 70 formed on the tube lane 11A affect the process of assembling the tube support plates 6A, 6B, 6C, 6D, 6E, 6F, and 6G and the heat transfer tubes 2.

With the flow straightening member 71, the main flow straightening plate 77 can straighten the flow of the supplied secondary coolant wc and the flow of the recirculating secondary coolant wh so that they flow upward at the boundaries with the main flow straightening plate 77, as shown in FIG. 9B. Therefore, mixing of the supplied secondary coolant wc and the recirculating secondary coolant wh above the tube lane 11A is reduced. The temperature of steam on the high-temperature side can thereby be increased.

With flow straightening member 71, the subsidiary flow straightening plates 76 and 78 can reduce the flows of the secondary coolant ww in the extending direction of the tube lane 11A, as shown in FIG. 9B. Therefore, the occurrence of a turbulent water flow caused by mixing of the supplied secondary coolant wc and the recirculating secondary coolant wh can be reduced. The flow straightening member 71 may have a structure in which the subsidiary flow straightening plates 76 and 78 are omitted and the main flow straightening plate 77 is secured to the mounts 75. In the above example, the flow straightening members 70 comprise the plurality of flow straightening members 71, 72, and 73. However, a single long flow straightening member formed in the extending direction of the tube lane 11A may be used.

As described above, the steam generator 140A of the present embodiment include: the barrel section 1 having a sealed hollow shape; the tube bundle outer casing 5 disposed with a predetermined gap provided between the casing 5 and the inner wall of the barrel section 1; the high temperature-side heat transfer tube bundle 20H and the low temperature-side heat transfer tube bundle 20C that include the plurality of heat transfer tubes 2 disposed in the tube bundle outer casing 5 and having an inverse U-shape; the tube plate 11 that is secured to the barrel section 1 on the side near the water chambers 13 and 14 and secures the ends of the plurality of heat transfer tubes 2; the plurality of tube support plates 6A, 6B, 6C, 6D, 6E, 6F, and 6G that support the heat transfer tubes 2; the steam-water separator 3 that is disposed in the upper portion of the barrel section 1 and separates steam and the recirculating secondary coolant wh from each other; and the supplied secondary coolant flow channel 7 for supplying the supplied secondary coolant wc to the tube bundle outer casing 5 with the supplied secondary coolant wc being isolated from the recirculating secondary coolant wh. The tube bundle outer casing 5 has: the recirculating secondary coolant injection section 5h for injecting the recirculating secondary coolant wh toward the high temperature-side heat transfer tube bundle 20H; and the supplied secondary coolant injection section 5c for injecting the supplied secondary coolant wc supplied from the supplied secondary coolant flow channel 7 toward the low temperature-side heat transfer tube bundle 20C, the recirculating secondary coolant injection section 5h and the supplied secondary coolant injection section 5c being formed on the side near the tube plate 11. Preferably, flow straightening members 70 shorter than the distance between the tube plate 11 and the tube support plate 6A are formed on the surface of the tube plate 11 and disposed between the high temperature-side heat transfer tube bundle 20H and the low temperature-side heat transfer tube bundle 20C.

With the above configuration, the mixing of the recirculating secondary coolant wh and the supplied secondary coolant wc can be suppressed. In contrast to the partition plate, the flow straightening members 70 are not required to pass through the tube support plate 6A. Therefore, the cost of the tube support plate 6A can be reduced when compared with the case where the partition plate is used.

Preferably, in the steam generator 140A of the present embodiment, the recirculating secondary coolant injection section 5h and the supplied secondary coolant injection section 5c are defined such that, of the supplied secondary coolant wc and the recirculating secondary coolant wh, the coolant having a higher relative flow rate than the other flows at a lower velocity.

With this configuration, the mixing of the recirculating secondary coolant wh with the supplied secondary coolant wc can be suppressed without using a partition plate. The temperature of steam in the high temperature-side heat transfer tube bundle 20H thereby increases, and the temperature of steam in the low temperature-side heat transfer tube bundle 20C decreases. Therefore, in the steam generator 140 of the present embodiment, heat transfer efficiency can be improved. In addition, in the steam generator 140A of the present embodiment, the man hours for assembling the partition plate and the burden of its cost can be reduced.

Third Embodiment

Figure 10:
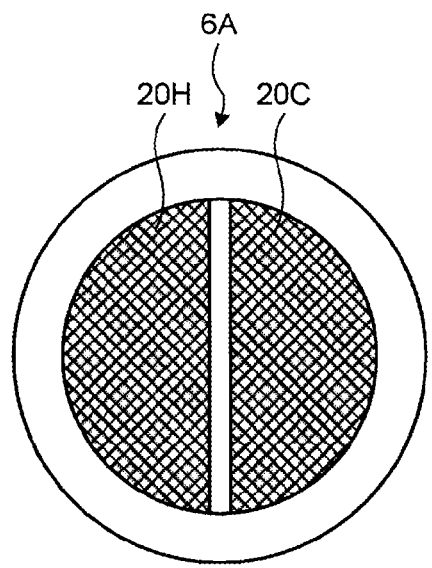
FIG. 10 is a schematic diagram illustrating an example of a tube support plate of a third embodiment.
Figure 11:
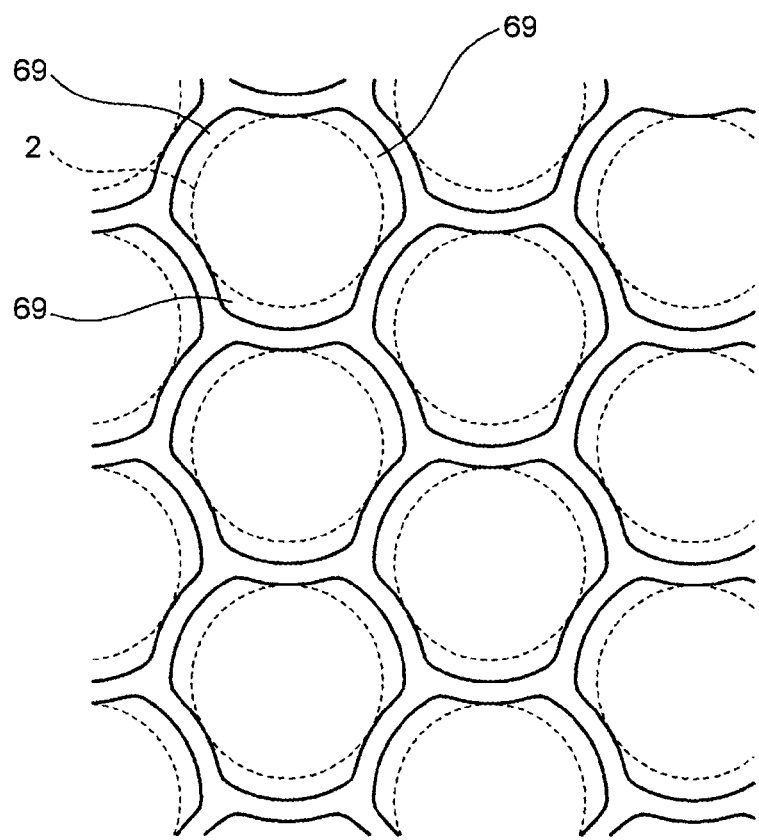
FIG. 11 is a schematic diagram illustrating an example of through holes in the tube support plate.

FIG. 10 is a schematic diagram illustrating an example of a tube support plate of the third embodiment. FIG. 11 is a schematic diagram illustrating an example of through holes in the tube support plate. A steam generator 140 in the third embodiment is characterized in that the opening areas of through holes 69 for the high temperature-side heat transfer tube bundle 20H are made smaller than the opening areas of through holes 60 for the low temperature-side heat transfer tube bundle 20C. In the following description, the same components as those described in the embodiments above are denoted by the same reference numerals, and a redundant description will be omitted.

As shown in FIG. 10, the tube support plate 6A supports the heat transfer tubes 2 bent in a substantially U-shape with their ends directed vertically downward. A semicircular region containing the high temperature-side heat transfer tube bundle 20H and a semicircular region containing the low temperature-side heat transfer tube bundle 20C are partitioned from each other and face each other.

For example, the through holes 69 shown in FIG. 11 have a so-called trefoil shape (a clover shape). Each through hole 69 has an opening area smaller by about 30 percent than the opening area of each through hole 60 shown in FIG. 5 above. Therefore, the pressure loss given by the through holes 69 to the supplied secondary coolant we and recirculating secondary coolant wh passing therethrough is larger than that given by the through holes 60 shown in FIG. 5.

For example, the steam generator 140 in the third embodiment is configured such that the tube support plate 6A has the through holes 69 disposed in the region of the high temperature-side heat transfer tube bundle and the through holes 60 disposed in the region of the low temperature-side heat transfer tube bundle 20C. In this configuration, the opening areas of the through holes 69 for the high temperature-side heat transfer tube bundle 20H are smaller than the opening areas of the through holes 60 for the low temperature-side heat transfer tube bundle 20C. Therefore, the supplied secondary coolant wc can more easily flow upward toward the steam-water separator 3 than the recirculating secondary coolant wh. The steam generator 140 includes a plurality of tube support plates 6A, 6B, 6C, 6D, 6E, 6F, and 6G. Preferably, among the plurality of tube support plates 6A, 6B, 6C, 6D, 6E, 6F, and 6G, the tube support plate 6A closest to the tube plate 11 or the tube support plates 6A and 6B are formed to have through holes 69 disposed in the region of the high temperature-side heat transfer tube bundle 20H and through holes 60 disposed in the region of the low temperature-side heat transfer tube bundle 20C. With this configuration, the mixing of the recirculating secondary coolant wh and the supplied secondary coolant wc in the tube bundle outer casing 5 on the side near the tube plate 11 can be easily suppressed. For example, the tube support plates 6C, 6D, 6E, 6F, and 6G are formed to have through holes 60 disposed in the region of the high temperature-side heat transfer tube bundle 20H and through holes 60 also disposed in the region of the low temperature-side heat transfer tube bundle 20C. With this configuration, the cost of the tube support plates 6C, 6D, 6E, 6F, and 6G can be reduced.

As described above, the steam generator 140 of the present embodiment includes: the barrel section 1 having a sealed hollow shape; the tube bundle outer casing 5 disposed with a predetermined gap provided between the casing 5 and the inner wall of the barrel section 1; the high temperature-side heat transfer tube bundle 20H and the low temperature-side heat transfer tube bundle 20C that include the plurality of heat transfer tubes 2 disposed in the tube bundle outer casing 5 and having an inverse U-shape; the tube plate 11 that is secured to the barrel section 1 on the side near the water chambers 13 and 14 and secures the ends of the plurality of heat transfer tubes 2; the plurality of tube support plates 6A, 6B, 6C, 6D, 6E, 6F, and 6G that support the heat transfer tubes 2; the steam-water separator 3 that is disposed in the upper portion of the barrel section 1 and separates steam and the recirculating secondary coolant wh from each other; and the supplied secondary coolant flow channel 7 for supplying the supplied secondary coolant wc to the tube bundle outer casing 5 with the supplied secondary coolant wc being isolated from the recirculating secondary coolant wh. The tube bundle outer casing 5 has: the recirculating secondary coolant injection section 5h for injecting the recirculating secondary coolant wh toward the high temperature-side heat transfer tube bundle 20H; and the supplied secondary coolant injection section 5c for injecting the supplied secondary coolant wc supplied from the supplied secondary coolant flow channel 7 toward the low temperature-side heat transfer tube bundle 20C, the recirculating secondary coolant injection section 5h and the supplied secondary coolant injection section 5c being formed on the side near the tube plate 11. Preferably, the tube support plate 6A or the tube support plates 6A and 6B are formed to have through holes 69 or first through holes disposed in the region of the high temperature-side heat transfer tube bundle 20H and through holes 60 or second through holes disposed in the region of the low temperature-side heat transfer tube bundle 20C. The opening areas of the through holes 69 being the first through holes are smaller than the opening areas of the through holes 60 being the second through holes. With this configuration, the mixing of the recirculating secondary coolant wh with the supplied secondary coolant wc can be suppressed.

Preferably, in the steam generator 140 of the present embodiment, the recirculating secondary coolant injection section 5h and the supplied secondary coolant injection section 5c are defined such that, of the supplied secondary coolant wc and the recirculating secondary coolant wh, the coolant having a higher relative flow rate than the other flows at a lower velocity.

With this configuration, the mixing of the recirculating secondary coolant wh with the supplied secondary coolant wc can be suppressed without using a partition plate. The temperature of steam in the high temperature-side heat transfer tube bundle 20H thereby increases, and the temperature of steam in the low temperature-side heat transfer tube bundle 20C decreases. Therefore, in the steam generator 140 of the present embodiment, heat transfer efficiency can be improved. In addition, in the steam generator 140 of the present embodiment, the man hours for assembling the partition plate and the burden of its cost can be reduced.

In the above embodiments, the steam generator has been described as an example of the heat exchanger of a pressurized water type nuclear power plant. In a fast neutron type nuclear reactor in which the core of the nuclear reactor is cooled using, for example, sodium, a primary sodium system and a secondary sodium system are provided to reduce the influence of a sodium-water reaction, and an intermediate heat exchanger for heat exchange between these two systems is provided. The heat of the secondary sodium is transferred to water in a steam generator to obtain steam. The applications of the heat exchangers of the embodiments include the intermediate heat exchanger and steam generator for a fast neutron type nuclear reactor.

REFERENCE SIGNS LIST 1 barrel section
2 heat transfer tube
3 steam-water separator
5 tube bundle outer casing
5c supplied secondary coolant injection section
5h recirculating secondary coolant injection section
6A, 6B, 6C, 6D, 6E, 6F, 6G tube support plate
7 supplied secondary coolant flow channel 11 tube plate
11A tube lane
13, 14 water chamber
17 supply tube
20H high temperature-side heat transfer tube bundle
20C low temperature-side heat transfer tube bundle
60, 69 through hole
70, 71, 72, 73 flow straightening member
77 main flow straightening plate
100 nuclear power plant
110 reactor containment vessel
130 pressurizer
140 steam generator
160 primary coolant tubing
210 turbine
220 power generator
230 condenser

The invention claimed is:

1. A steam generator comprising:
a barrel section having a sealed hollow shape;
a tube bundle outer casing being disposed with a predetermined gap provided between the tube bundle outer casing and an inner wall of the barrel section;
a tube bundle with a high temperature side and a low temperature side including a plurality of heat transfer tubes disposed in the tube bundle outer casing and having an inverse U-shape;
a tube plate being secured to the barrel section on a side near a water chamber so as to secure ends of the plurality of heat transfer tubes;
a plurality of tube support plates for supporting the heat transfer tubes;
a steam-water separator being disposed in an upper portion of the barrel section so as to separate steam and a recirculating secondary coolant;
a water supply channel for supplying a secondary coolant to the tube bundle outer casing with the secondary coolant being isolated from the recirculating secondary coolant;
a recirculating secondary coolant injection section for injecting the recirculating secondary coolant toward the high temperature-side heat transfer tube bundle;
a supplied secondary coolant injection section for injecting the secondary coolant supplied from the water supply channel toward the low temperature-side heat transfer tube bundle, the recirculating secondary coolant injection section and the supplied secondary coolant injection section being disposed in the tube bundle outer casing on a side near the tube plate; and
a flow straightening member shorter than distances between the tube plate and any one of the tube support plates, the flow straightening member being formed on a surface of the tube plate and disposed between the high temperature-side heat transfer tube bundle and the low temperature-side heat transfer tube bundle, the flow straightening member comprising a solid plate having a first vertical surface and a second vertical surface opposite to the first vertical surface, wherein the supplied secondary coolant contacts the first vertical surface and the recirculating secondary coolant contacts the second vertical surface,
wherein the recirculating secondary coolant injection section includes an opening formed on the tube bundle outer casing near the tube plate, and
the supplied secondary coolant injection section includes an opening formed on the tube bundle outer casing near the tube plate, and
the recirculating secondary coolant injection section and the supplied secondary coolant injection section are configured such that an area of the opening of the recirculating secondary coolant injection section is different from an area of the opening of the supplied secondary coolant injection section, in order that the coolant having a higher relative flow rate than the other flows at a lower velocity and a velocity difference between the secondary coolant at the recirculating secondary coolant injection section and the recirculating secondary coolant at the supplied secondary coolant injection section is reduced.

2. The steam generator according to claim 1, wherein the tube support plate includes first through holes for the high temperature-side heat transfer tube bundle, through which the heat transfer tubes pass, and second through holes for the low temperature-side heat transfer tube bundle, through which the heat transfer tubes pass, and an opening area of each of the first through holes is smaller than an opening area of each of the second through holes.

3. The steam generator according to claim 1, wherein any adjacent three of the heat transfer tubes are arranged to constitute a triangular pattern, and a ratio of a pitch of the heat transfer tubes to an outer diameter thereof is smaller than 1.46.

4. The steam generator according to claim 1, wherein the ratio of a height of the opening of the supplied secondary coolant injection section in a lengthwise direction of the barrel is set to be smaller than a height of the opening of the recirculating secondary coolant injection section in a lengthwise direction of the barrel.

* * * * *